US012581145B2

(12) United States Patent
Xiong et al.

(10) Patent No.: US 12,581,145 B2
(45) Date of Patent: Mar. 17, 2026

(54) SYSTEMS, METHODS, AND DEVICES FOR VIDEO STREAM SYNCHRONIZATION

(71) Applicant: Cypress Semiconductor Corporation, San Jose, CA (US)

(72) Inventors: Ying Xiong, Dalian (CN); Hung Pan Ng, Hong Kong (HK); Rongbin Qiu, Shanghai (CN)

(73) Assignee: Infineon Technologies Americas Corp., El Segundo, CA (US)

( * ) Notice: Subject to any disclaimer, the term of this patent is extended or adjusted under 35 U.S.C. 154(b) by 0 days.

(21) Appl. No.: 18/680,033

(22) Filed: May 31, 2024

(65) Prior Publication Data

US 2025/0373871 A1     Dec. 4, 2025

(51) Int. Cl.
*H04N 21/242* (2011.01)
*H04N 5/067* (2006.01)
*H04N 21/43* (2011.01)

(52) U.S. Cl.
CPC ......... *H04N 21/242* (2013.01); *H04N 5/0675* (2013.01); *H04N 21/4305* (2013.01)

(58) Field of Classification Search
CPC . H04N 21/4305; H04N 5/0675; H04N 21/242
See application file for complete search history.

(56) References Cited

U.S. PATENT DOCUMENTS

2006/0044289 A1* 3/2006 Yee ........................ G09G 5/363
                                                        345/204
2014/0168243 A1* 6/2014 Huang ..................... G06T 1/20
                                                        345/522
2021/0225320 A1* 7/2021 Sin ......................... G09G 5/003

* cited by examiner

*Primary Examiner* — Nathan J Flynn

(57) ABSTRACT

Systems, methods, and devices perform synchronization operations for video streams. Methods include receiving a video frame at a frame capture unit, the video frame being included in a stream of video data, buffering the video frame using a buffer coupled between the frame capture unit and a frame display unit, and determining an offset value based, at least in part, on a refresh rate associated with the frame capture uni. Methods further include reading, using the frame display unit, the video frame from the buffer after a designated period of time defined by the offset value.

20 Claims, 5 Drawing Sheets

Vehicle 101

HUD Projector Module 110

Head Unit 102

Processing Device 112

Capture Unit 113

Host Processor 104

Display Engine 108

Buffer 114

Memory System 106

Display Unit 119

Layer 116

Layer 118

Display Module 120

Display Module 122

Optical Projection System 124

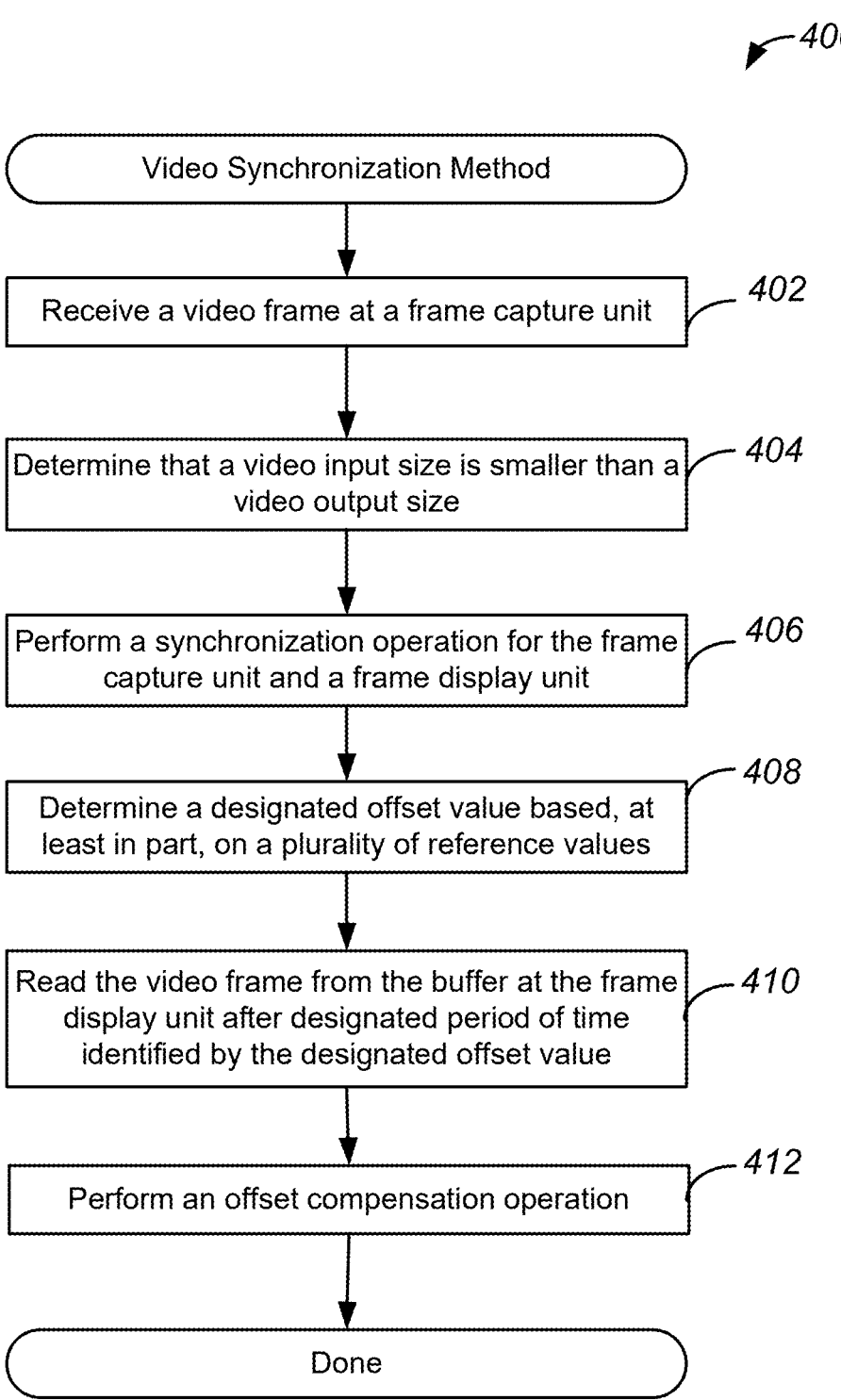

*400*

Video Synchronization Method

Receive a video frame at a frame capture unit   *402*

Determine that a video input size is smaller than a video output size   *404*

Perform a synchronization operation for the frame capture unit and a frame display unit   *406*

Determine a designated offset value based, at least in part, on a plurality of reference values   *408*

Read the video frame from the buffer at the frame display unit after designated period of time identified by the designated offset value   *410*

Perform an offset compensation operation   *412*

Done

*FIG. 4*

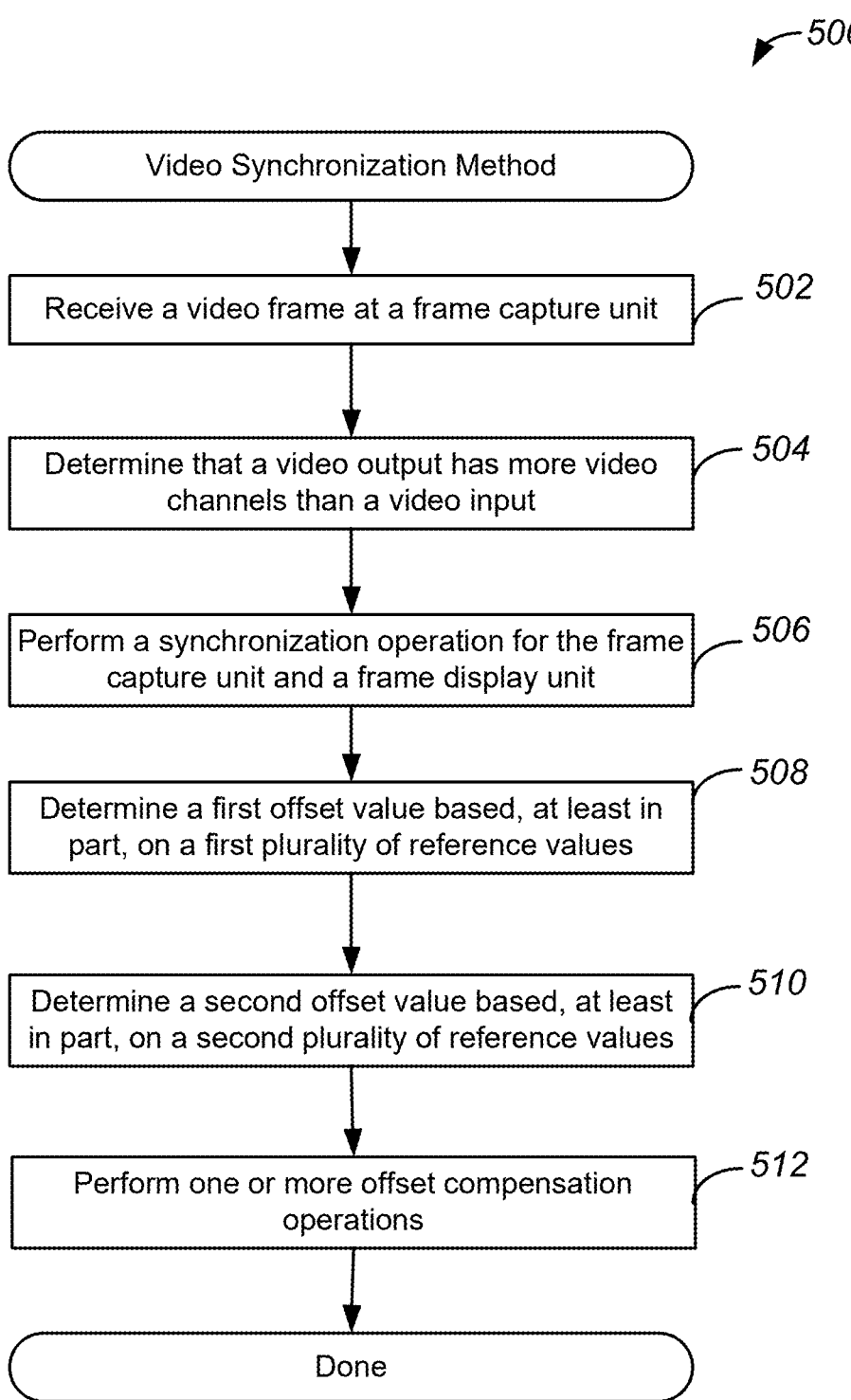

*500*

Video Synchronization Method

Receive a video frame at a frame capture unit    *502*

Determine that a video output has more video channels than a video input    *504*

Perform a synchronization operation for the frame capture unit and a frame display unit    *506*

Determine a first offset value based, at least in part, on a first plurality of reference values    *508*

Determine a second offset value based, at least in part, on a second plurality of reference values    *510*

Perform one or more offset compensation operations    *512*

Done

*FIG. 5*

SYSTEMS, METHODS, AND DEVICES FOR VIDEO STREAM SYNCHRONIZATION

TECHNICAL FIELD

This disclosure relates to video streaming, and more specifically, to enhancement of synchronizing of components used in such video streaming.

BACKGROUND

Video display systems and devices may utilize the streaming of video data to pass such video data from a video source to a video display. Accordingly, a stream of video data may be received as a video input, and one or more components may process the video data before it is provided as a video output to a video display. Conventional techniques for processing a received video input and preparing it for display at a video display remain limited because they use multiple buffers and additional hardware resources to perform warping and scaling operations for video outputs that are generated for the video display.

BRIEF DESCRIPTION OF THE DRAWINGS

FIG. 4 illustrates an additional example of a method for video stream synchronization, performed in accordance with some embodiments.

FIG. 5 illustrates another example of a method for video stream synchronization, performed in accordance with some embodiments.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Embodiments disclosed herein provide efficient buffering for processing of video streams. As will be discussed in greater detail below, a single buffer may be used to buffer video data for a video stream during a variety of operational conditions. For example, a single buffer may be used even when there are differences in input and output sizes of video data, or when there are varying numbers of channels. Accordingly, embodiments disclosed herein avoid the use of multiple buffers while ensuring synchronicity is maintained between an input stream and an output stream. In this way, efficient video streaming modalities are provided that use reduced hardware resources.

Figure 1:
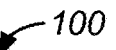
FIG. 1 illustrates an example of a video streaming system, configured in accordance with some embodiments.

FIG. 1 illustrates an example of a video streaming system, configured in accordance with some embodiments. As will be discussed in greater detail below, a system, such as system 100, may be implemented to perform efficient synchronization for video streaming components. More specifically, synchronization operations and temporal offsets may be used to ensure that a video frame capture unit and a video frame display unit stay synchronized and do not experience errors and/or video data artefacts.

In various embodiments, system 100 includes vehicle 101. Accordingly, embodiments disclosed herein may be implemented in an operational environment that may be a vehicle, such as an automobile. In various embodiments, vehicle 101 includes head unit 102 which may be a head unit of an infotainment system. In various embodiments, head unit 102 supports various applications and associated functionalities, such as navigation and geolocation, video camera displays, as well as various other vehicle information systems. Accordingly, head unit 102 includes host processor 104 and memory system 106 which are configured to execute applications underlying these functions as well as store data associated with such applications.

In various embodiments, head unit 102 additionally includes display engine 108. In various embodiments, display engine 108 is an augmented reality engine that is configured to receive data from components of head unit 102, and generate a stream of video data that includes an augmented reality display of such data capable of being displayed in a heads-up-display (HUD) of vehicle 101. As will be discussed in greater detail below, such a HUD may be configured to project a reflected image on a windshield of vehicle 101 such that a user sitting in a driver's seat of vehicle 101 is able to see the projected image as an overlay of what the user is viewing through the windshield. Accordingly, display engine 108 is configured to generate video data that is projected onto the inside surface of the windshield. It will be appreciated that any suitable rendering engine may be used to generate the video data. More specifically, any suitable augmented reality software configured to generate video data for an augmented reality display may be used.

In various embodiments, system 100 additionally includes HUD projector module 110 which may be configured to receive video data from display engine 108, and may be further configured to generate a video output stream that is provided to one or more displays. More specifically, HUD projector module 110 may include processing device 112, which may include one or more processors configured to perform buffering and synchronization operations disclosed herein. In one example, processing device 112 includes processing elements configured to implement a frame capture unit, such as capture unit 113, and a frame display unit, such as display unit 119, that may handle input and output operations associated with video frames. Moreover, processing device 112 may include buffer 114 which is configured to buffer a received video frame. As will be discussed in greater detail below, processing device 112 is configured to manage operation of the frame capture unit and a frame display unit such that synchronicity of an input video stream and an output video stream is ensured, and a single buffer is used. Processing device 112 may also include one or more video processing layers, such as layer 116 and layer 118. In one example, layer 116 and layer 118 may be warping layers configured to perform warping operations on video data to prepare them for display on, for example, a windshield.

Processing device 112 may provide generated video outputs to one or more displays such as display module 120 and display module 122. In various embodiments, display module 120 and display module 122 are projector elements configured to receive a stream of video data and project the video data via one or more optical elements that may include, for example, one or more lenses and mirrors that may be included in an optical projection system, such as optical projection system 124. Accordingly, display module 120 and display module 122 may each display video data that is part of a HUD. In various embodiments, display module 120 and display module 122 are configured such that display module 120 displays a near image that is perceived as being close to the user, and display module 122 displays a far image that is perceived as being more distant from the user.

Figure 2:
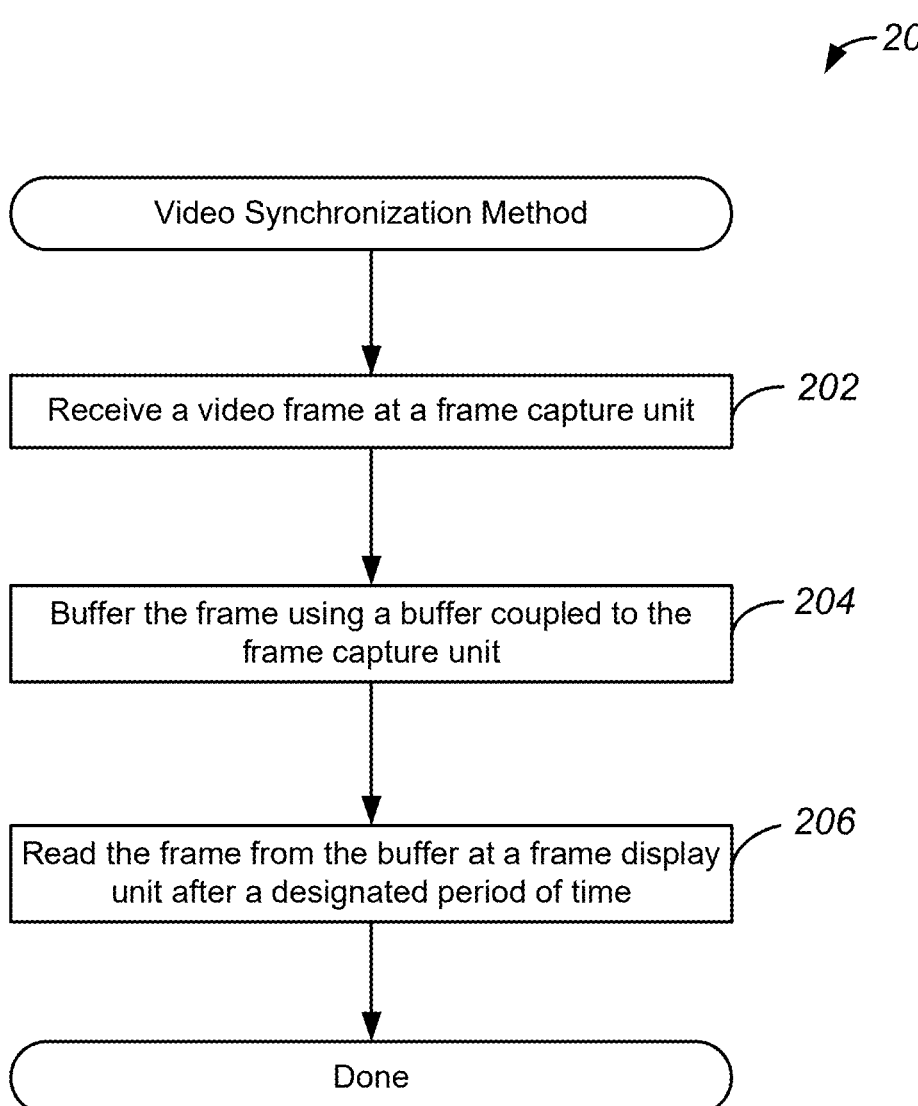
FIG. 2 illustrates an example of a method for video stream synchronization, performed in accordance with some embodiments.

FIG. 2 illustrates an example of a method for video stream synchronization, performed in accordance with some embodiments. As will be discussed in greater detail below, a method, such as method 200, may be performed to synchronize video streaming components. More specifically, the use of a buffer may be managed such that a single buffer may be used while ensuring that a video frame capture unit and a video frame display unit stay synchronized and do not experience errors and/or video data artefacts.

Method 200 may perform operation 202 during which a video frame may be received at a frame capture unit. In various embodiments, the frame capture unit may fetch video data frames from a received video stream and may provide the video data frame to downstream components used for video data processing. Accordingly, the frame capture unit may operate as a fetch unit that retrieved a video data frame when, for example, a buffer level indicates a frame should be fetched. As will be discussed in greater detail below, a synchronization operation may be implemented responsive to the video frame being received. Such a synchronization operation may synchronize a pixel clock of the frame capture unit with a pixel clock of the frame display unit.

Method 200 may perform operation 204 during which the frame may be buffered using a buffer coupled to the frame capture unit. Accordingly, the received video frame may be provided to the buffer and may be stored in the buffer. In various embodiments, a size of the buffer may be configured such that it has a size capable of storing one video frame.

Method 200 may perform operation 206 during which the frame may be read from the buffer at a frame display unit after a designated period of time. Accordingly, the frame display unit may be configured to read the video frame from the buffer and provide the read data to a downstream component, such as warping layer. In various embodiments, the read operation of the frame display unit is delayed by a designated period of time from the corresponding write operation of the frame capture unit. As will be discussed in greater detail below, the designated period of time may be a computed offset value that is computed to ensure that the video output and video input do not desynchronize.

Figure 3:
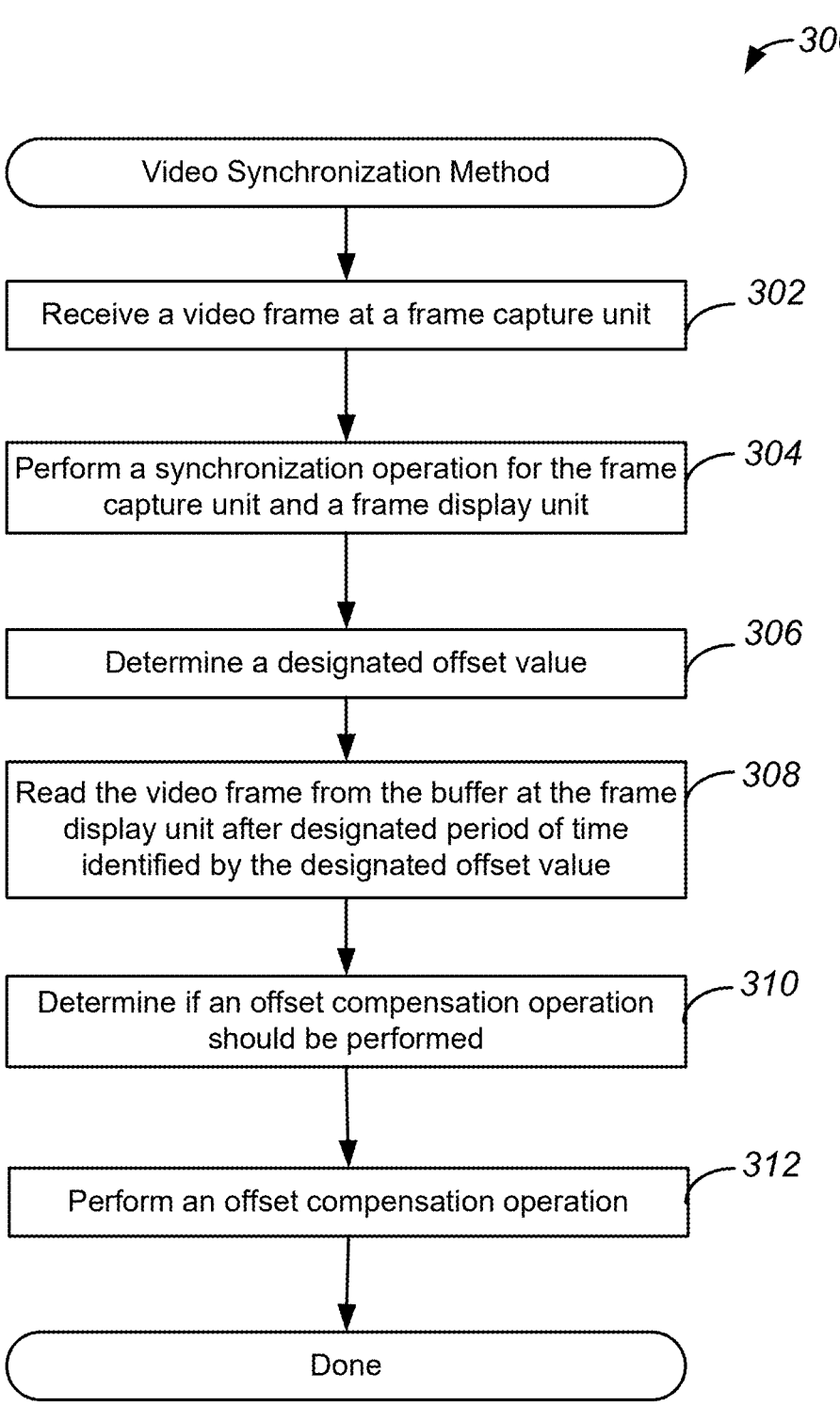
FIG. 3 illustrates another example of a method for video stream synchronization, performed in accordance with some embodiments.

FIG. 3 illustrates another example of a method for video stream synchronization, performed in accordance with some embodiments. As will be discussed in greater detail below, a method, such as method 300, may be performed to synchronize video streaming components. More specifically, the use of a buffer may be managed such that a single buffer may be used while ensuring that a video frame capture unit and a video frame display unit stay synchronized and do not experience errors and/or video data artefacts.

Method 300 may perform operation 302 during which a video frame may be received at a frame capture unit. As similarly discussed above, the frame capture unit may fetch video data frames from a received video stream and may provide the video data frame to downstream components used for video data processing. Accordingly, during operation 302, the next video frame may be received, and the frame capture unit may prepare to begin writing the video frame to the buffer.

Method 300 may perform operation 304 during which a synchronization operation may be performed for the frame capture unit and a frame display unit. In various embodiments, the synchronization operation is performed responsive to the video frame being received. Moreover, the synchronization operation may synchronize a pixel clock of the frame capture unit with a pixel clock of the frame display unit. In some embodiments, the synchronization operation is a VSynch operation. Moreover, a video in refresh rate may be set to be the same as a video out refresh rate. Accordingly, refresh rates of the frame capture unit and the frame display unit may be set to be the same.

Method 300 may perform operation 306 during which a designated offset value may be determined. In various embodiments, a designated offset value may be computed that ensures that synchronicity and stability are maintained for processing of the video frame. The offset value may be determined based on one or more parameters associated with downstream components. For example, the number of keep-lines specified by a downstream warping layer may be used to compute the designated offset value. In this example, the designated offset value is specified as a number of buffer lines.

In another example, the designated offset value may be computed based on a refresh rate or other buffer parameters. For example, if a refresh rate is 60 Hz, a reference value of $\frac{1}{60}$ may be used as a boundary. Accordingly, the designated offset value may be bounded by that value and may be set to a value of 0 ms<T_Offset<16.6 ms. In this example, the designated offset value may be set in between the boundary values to a value of 8.3 ms.

Method 300 may perform operation 308 during which the video frame may be read from the buffer at the frame display unit after designated period of time identified by the designated offset value. As similarly discussed above, the frame display unit may be configured to read the video frame from the buffer and provide the read data to a downstream component, such as warping layer. In various embodiments, the read operation of the frame display unit is delayed by a designated period of time from the corresponding write operation of the frame capture unit. The designated period of time may be the designated offset value that was computed during operation 306.

Method 300 may perform operation 310 during which it may be determined if an offset compensation operation should be performed. In various embodiments, such a determination may be made by monitoring the value of the offset value and monitoring the values of the pixel clocks of the frame capture unit and the frame display unit to see if their clocks have drifted too far apart. Such a determination may be made based on a comparison of the difference in their timings with a designated threshold value, which may be set to the offset value. Accordingly, if the difference in clock values exceeds the offset value, it may be determined that a compensation operation may be performed.

Method 300 may perform operation 312 during which an offset compensation operation may be performed. In various embodiments, the offset compensation operation may be an additional synchronization operation. Accordingly, an additional synchronization operation may be performed, as similarly discussed above with reference to operation 304, to synchronize the pixel clocks of the frame capture unit and the frame display unit and reestablish their synchronicity.

FIG. 4 illustrates an additional example of a method for video stream synchronization, performed in accordance with some embodiments. As will be discussed in greater detail below, a method, such as method 400, may be performed to synchronize video streaming components. More specifically, the use of a buffer may be managed such that a single buffer may be used while ensuring that a video frame capture unit and a video frame display unit stay synchronized and do not experience errors and/or video data artefacts.

Method 400 may perform operation 402 during which a video frame may be received at a frame capture unit. As similarly discussed above, the frame capture unit may fetch video data frames from a received video stream and may provide the video data frame to downstream components used for video data processing. Accordingly, during operation 402, the next video frame may be received, and the frame capture unit may prepare to begin writing the video frame to the buffer.

Method 400 may perform operation 404 during which it may be determined that a video input size is smaller than a video output size. In various embodiments, such a determination may be made based on known resolutions of the frame capture unit and the frame display unit. Accordingly, the known resolutions may be compared, and the appropriate determination may be made.

Method 400 may perform operation 406 during which a synchronization operation may be performed for the frame capture unit and a frame display unit. In various embodiments, the synchronization operation is performed responsive to the video frame being received. Moreover, the synchronization operation may synchronize a pixel clock of the frame capture unit with a pixel clock of the frame display unit. In some embodiments, the synchronization operation is a VSynch operation.

Method 400 may perform operation 408 during which a designated offset value may be determined based on a plurality of reference values. In one example, the reference values may include a first reference value T_Value1 and a second reference value T_Value2. The designated offset value may be bounded by the two reference values such that T_Value1<T_Offset<T_Value2. In this example, the designated offset value may be set halfway between the reference values. Moreover, the reference values may be determined based on equations 1-3 shown below:

$$T = 1/f \tag{1}$$

$$\text{T\_Value1} = (720 - (k + 480))/720 * T \tag{2}$$

$$\text{T\_Value2} = (720 - k)/720 * T \tag{3}$$

In equations 1-3 shown above, a video input may have 480 lines, and a video output may have 720 lines. Moreover, f may be a refresh rate which may be, for example, 60 Hz. Moreover, k may be an identifier or index value that identifies a buffer line that stores the first line of a frame. Accordingly, a received video input may have a video frame including 480 lines which are stored in the buffer, and ultimately displayed in a output display frame having 720 lines. The k line may identify a position, such as a line, from which to start display of the buffer content. In this example, T_Value1 may be a time relative to the reception of the next video frame, and may be a reference value that bounds the designated offset value such that it does not permit overlap with activity of the display unit. Moreover, T_Value2 may be a time relative to the reception of the next video frame, and may be a reference value that bounds the designated offset value such that it does not permit overlap with activity of the capture unit. As discussed above, T_Offset may be set between T_Value1 and T_Value2. In this way, the designated offset value may prevent crossing of buffer accesses by the capture unit and display unit while also tolerating some deviation in the behavior of the capture unit and display unit.

Method 400 may perform operation 410 during which the video frame may be read from the buffer at the frame display unit after designated period of time identified by the designated offset value. As similarly discussed above, the frame display unit may be configured to read the video frame from the buffer and provide the read data to a downstream component, such as warping layer. In various embodiments, the read operation of the frame display unit is delayed by a designated period of time from the corresponding write operation of the frame capture unit. The designated period of time may be the designated offset value that was computed during operation 408.

Method 400 may perform operation 412 during which an offset compensation operation may be performed. In various embodiments, the offset compensation operation may be an additional synchronization operation. Accordingly, if it is determined that an offset compensation operation should be performed, an additional synchronization operation may be performed to synchronize the pixel clocks of the frame capture unit and the frame display unit.

FIG. 5 illustrates another example of a method for video stream synchronization, performed in accordance with some embodiments. As will be discussed in greater detail below, a method, such as method 500, may be performed to synchronize video streaming components. More specifically, the use of a buffer may be managed such that a single buffer may be used while ensuring that a video frame capture unit and a video frame display unit stay synchronized and do not experience errors and/or video data artefacts. As will be discussed in greater detail below, such synchronization may also be maintained for multiple display outputs.

Method 500 may perform operation 502 during which a video frame may be received at a frame capture unit. As similarly discussed above, the frame capture unit may fetch video data frames from a received video stream and may provide the video data frame to downstream components used for video data processing. Accordingly, during operation 302, the next video frame may be received, and the frame capture unit may prepare to begin writing the video frame to the buffer.

Method 500 may perform operation 504 during which it may be determined that a video output has more video channels than a video input. For example, a video input may have a single channel, and a video output may have multiple channels. In an example where an input is received from an augmented reality engine, the input may have one channel of data, but may ultimately be split to two channels for different display modules that may project near and far images.

Method 500 may perform operation 506 during which a synchronization operation may be performed for the frame capture unit and a frame display unit. In various embodiments, the synchronization operation is performed responsive to the video frame being received. Moreover, the synchronization operation may synchronize a pixel clock of the frame capture unit with a pixel clock of the frame display unit. In some embodiments, the synchronization operation is a VSynch operation.

Method 500 may perform operation 508 during which a first offset value may be determined based on a first plurality of reference values for a first display output channel. In one example, the reference value T_Value2 may be used to bound the first offset value. For example, the first offset value may be determined such that 0<T_Offset1<T_Value2. In this example, first offset value may be set halfway between the reference values. In various embodiments, T_Value2 may be determined based on equations 4, 5, and 6 below:

$$T = 1/f \quad (4)$$

$$T\_Value1 = k/1200 * T \quad (5)$$

$$T\_Value2 = j/1200 * T \quad (6)$$

In equations 4, 5, and 6 shown above, a video input may have a video frame that includes 1200 lines, and a video output may have 720 lines. Moreover, f may be a refresh rate which may be, for example, 60 Hz. As similarly discussed above, k may represent an index value identifying a buffer line, and j may be k+720. Accordingly, when k=0, it will be appreciated that T_Value1 is 0, and T_Value2=720/1200*T. Moreover, T_Value2 may be used to determine T_Offset1 by setting T_Offset1 halfway between T_Value2 and T_Value1, which may be 0 Moreover, T_Offset1 may be used for a first display output that may have two display output channels, as may be implemented in an augmented reality display.

Method 500 may perform operation 510 during which a second offset value may be determined based on a second plurality of reference values for a second display output channel. In one example, the reference value T_Value1 may be used to bound the second offset value. For example, the second offset value may be determined such that T_Value1<T_Offset2<16.6 ms. In this example, the second offset value may be set halfway between T_Value1 and T, given by equation 6 below. Thus, in various embodiments, T_Value1 may be determined based on equations 6, 7, and 8 below:

$$T = 1/f \quad (7)$$

$$T\_Value1 = k/1200 * T \quad (8)$$

$$T\_Value2 = j/1200 * T \quad (9)$$

In equations 7, 8, and 9 shown above, a video input may include a video frame having 1200 lines, and video outputs may have 720 lines. Moreover, f may be a refresh rate which may be, for example, 60 Hz. As similarly discussed above, k may represent an index value identifying a buffer line. In this example, k may be 720, and j may be 1200. Accordingly, T_Value1 may be 720/1200*T, and T_Value2 may be 1200/1200*T, which is also expressed as T. As discussed above, T_Value1 may be used to determine T_Offset2, which may be set halfway between T_Value1 and T. Accordingly, T_Offset2 may be used for a second display output that may also have two display output channels.

Method 500 may perform operation 512 during which one or more offset compensation operations may be performed. In various embodiments, the offset compensation operation may be an additional synchronization operation. Accordingly, if it is determined that an offset compensation operation should be performed, an additional synchronization operation may be performed to synchronize the pixel clocks of the frame capture unit and the frame display unit.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
receiving a video frame at a frame capture unit, the video frame being included in a stream of video data;
buffering the video frame using a buffer coupled between the frame capture unit and a frame display unit;
determining an offset value based, at least in part, on a refresh rate associated with the frame capture unit; and
reading, using the frame display unit, the video frame from the buffer after a designated period of time defined by the offset value.

2. The method of claim 1 further comprising:
synchronizing a pixel clock of the frame capture unit and the frame display unit.

3. The method of claim 1, wherein the buffering further comprises:
writing, using the frame capture unit, the video frame to a plurality of lines of the buffer.

4. The method of claim 1 further comprising:
performing a compensation operation to update the offset value.

5. The method of claim 1, wherein a size of a video input of the frame capture unit is smaller than a size of a video output of the frame display unit.

6. The method of claim 5 further comprising:
determining the offset value based on a plurality of reference values.

7. The method of claim 1, wherein a number of channels included in a video input of the frame capture unit is smaller than a number of channels included in a video output of the frame display unit.

8. The method of claim 7 further comprising:
determining the offset value based on a first plurality of reference values; and
determining an additional offset value based on a second plurality of reference values.

9. The method of claim 1, wherein the stream of video data comprises augmented reality video data.

10. A system comprising:
a memory device comprising a buffer, the buffer being configured to buffer video data; and
a processing device comprising a frame capture unit and a frame display unit, the processing device configured to:
receive a video frame at the frame capture unit, the video frame being included in a stream of video data;
determine an offset value based, at least in part, on a refresh rate associated with the frame capture unit; and
read, using the frame display unit, the video frame from the buffer after a designated period of time defined by the offset value.

11. The system of claim 10, wherein the processing device is further configured to:
synchronize a pixel clock of the frame capture unit and the frame display unit.

12. The system of claim 10, wherein a size of a video input of the frame capture unit is smaller than a size of a video output of the frame display unit.

13. The system of claim 12, wherein the processing device is further configured to:

determine the offset value based on a plurality of reference values.

14. The system of claim 10, wherein a number of channels included in a video input of the frame capture unit is smaller than a number of channels included in a video output of the frame display unit.

15. The system of claim 14, wherein the processing device is further configured to:

determine the offset value based on a first plurality of reference values; and determine an additional offset value based on a second plurality of reference values.

16. A device comprising:

processing elements configured to:

receive a video frame at the frame capture unit, the video frame being included in a stream of video data;

buffer the video frame using a buffer coupled between the frame capture unit and a frame display unit;

determine an offset value based, at least in part, on a refresh rate associated with the frame capture unit; and read, using the frame display unit, the video frame from the buffer after a designated period of time defined by the offset value.

17. The device of claim 16, wherein the processing elements are further configured to:

synchronize a pixel clock of the frame capture unit and the frame display unit.

18. The device of claim 16, wherein a size of a video input of the frame capture unit is smaller than a size of a video output of the frame display unit, and wherein the processing elements are further configured to:

determine the offset value based on a plurality of reference values.

19. The device of claim 16, wherein a number of channels included in a video input of the frame capture unit is smaller than a number of channels included in a video output of the frame display unit.

20. The device of claim 19, wherein the processing elements are further configured to:

determine the offset value based on a first plurality of reference values; and determine an additional offset value based on a second plurality of reference values.

* * * * *